United States Patent
Turpin et al.

(10) Patent No.: US 6,608,721 B1
(45) Date of Patent: Aug. 19, 2003

(54) OPTICAL TAPPED DELAY LINE

(75) Inventors: Terry M. Turpin, Columbia, MD (US); Fred F. Froehlich, Baltimore, MD (US); D. Bruce Nichols, Columbia, MD (US)

(73) Assignee: Essex Corporation, Columbia, MD (US)

( * ) Notice: Subject to any disclaimer, the term of this patent is extended or adjusted under 35 U.S.C. 154(b) by 89 days.

(21) Appl. No.: 09/687,029

(22) Filed: Oct. 13, 2000

Related U.S. Application Data

(60) Provisional application No. 60/208,894, filed on Jun. 2, 2000.

(51) Int. Cl.⁷ ............................................... G02B 27/00
(52) U.S. Cl. ..................... 359/577; 359/580; 359/589; 359/634; 385/24; 398/79
(58) Field of Search ................................ 359/577, 580, 359/584, 589, 634, 127, 124; 385/24; 398/79

(56) References Cited

U.S. PATENT DOCUMENTS

| | | | |
|---|---|---|---|
| 4,871,232 A | 10/1989 | Grinberg et al. | |
| 5,881,079 A | * 3/1999 | Doerr et al. | ................. 372/102 |
| 6,144,494 A | 11/2000 | Shirasaki et al. | |
| 6,169,630 B1 | 1/2001 | Shirasaki et al. | |
| 6,185,040 B1 | 2/2001 | Shirasaki et al. | |

FOREIGN PATENT DOCUMENTS

| | | |
|---|---|---|
| EP | 0 881 527 | 12/1998 |
| EP | 1 001 287 A2 | 5/2000 |
| JP | 10-256663 | 9/1998 |
| JP | 11-95061 | 4/1999 |
| JP | 11-101923 | 4/1999 |
| JP | 11-119173 | 4/1999 |
| JP | 11-171608 | 6/1999 |
| JP | 11-174268 | 7/1999 |
| JP | 11-202151 | 7/1999 |
| JP | 11-223745 | 8/1999 |
| JP | 11-258413 | 9/1999 |
| JP | 11-511568 | 10/1999 |
| JP | 11-326687 | 11/1999 |
| JP | 11-513138 | 11/1999 |
| JP | 11-352356 | 12/1999 |
| JP | 2000-147280 | 5/2000 |
| JP | 2000-147305 | 5/2000 |
| JP | 2000-171649 | 6/2000 |
| WO | WO 99/39411 | 8/1999 |
| WO | WO 00/22741 | 4/2000 |

OTHER PUBLICATIONS

Shirasaki, M. "Large angular dispersion by a virtulaly imaged phased array and its application to a wavelength demultiplexer", Optics Letters, Optical Society of America, vol. 21, No. 5, pp. 366,368, Mar. 1, 1996.

Shirasaki, M. et al., "Virtually imaged phased array with graded reflectivity", IEEE Photonics Technology Letters, IEEE, Inc., New York, US, vol. 11, No. 11, pp. 1443–1445, Nov. 1999.

Graeme et al., "Monolithic 16–channel Fourier–optic–based WDM in Planar Silica" 1/1993, Proc. SPIE vol. 1792, p.78–88.

Jacob et al., "Very High Bit Rate Optical Switch for ATM Application", 1994, Communication & Transmission vol. 16, No. 2, pp. 5–14.

Davis et al., "Phase Analysis of Diffracted Beams Using Multiplexed Fourier Transform Lenses", 1/1995, Optical Engineering 34(01), pp 50–55.

\* cited by examiner

Primary Examiner—John Juba
Assistant Examiner—Fayez Assaf
(74) Attorney, Agent, or Firm—Morrison & Foerster LLP

(57) ABSTRACT

An OTDL device in accordance with the present invention is a method for and device for spatially resolving the wavelengths in an optical signal, i.e., channelizing or demultiplexing. The device is based on a tapped optical delay line.

46 Claims, 7 Drawing Sheets

Example embodiment of an Optical Tapped Delay Line (OTDL) channelizer system.

Operational side view of an OTDL device.

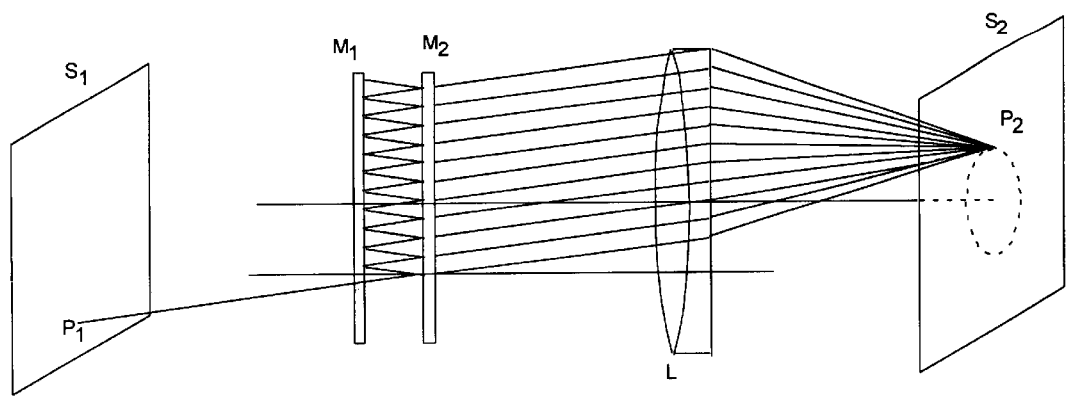
Figure 1. Prior art of a Fabry-Perot interferometer.
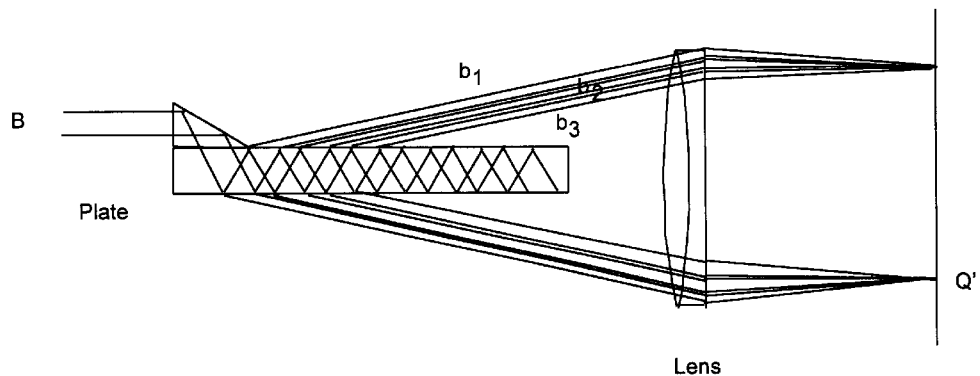
Figure 2. Prior art of a Lummer-Gehrcke interferometer.

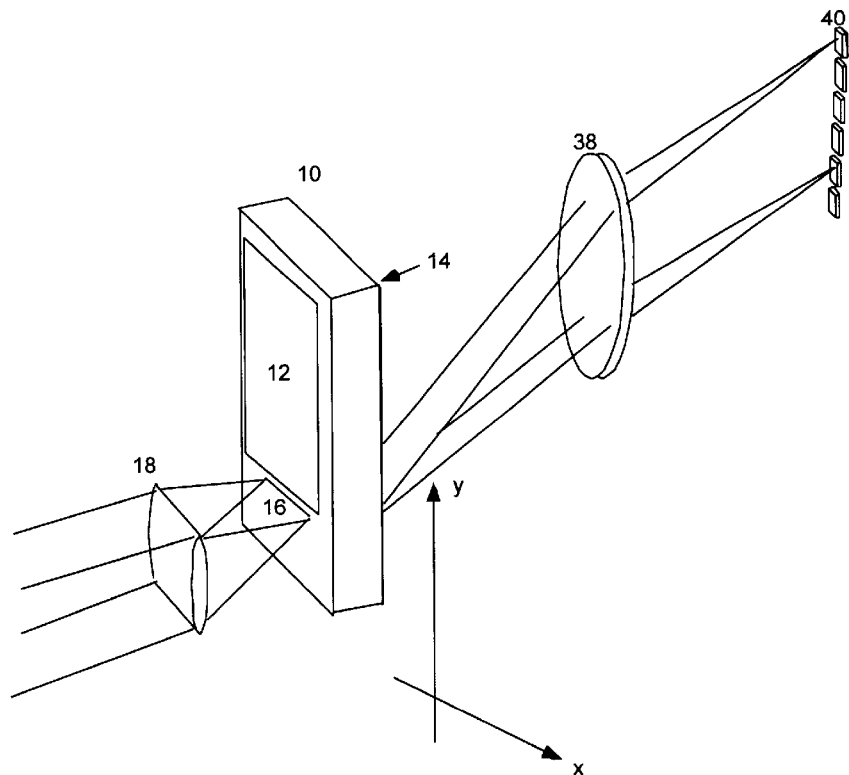
Figure 3. Prior art of a Virtually Imaged Phased Array (VIPA) channelizer.
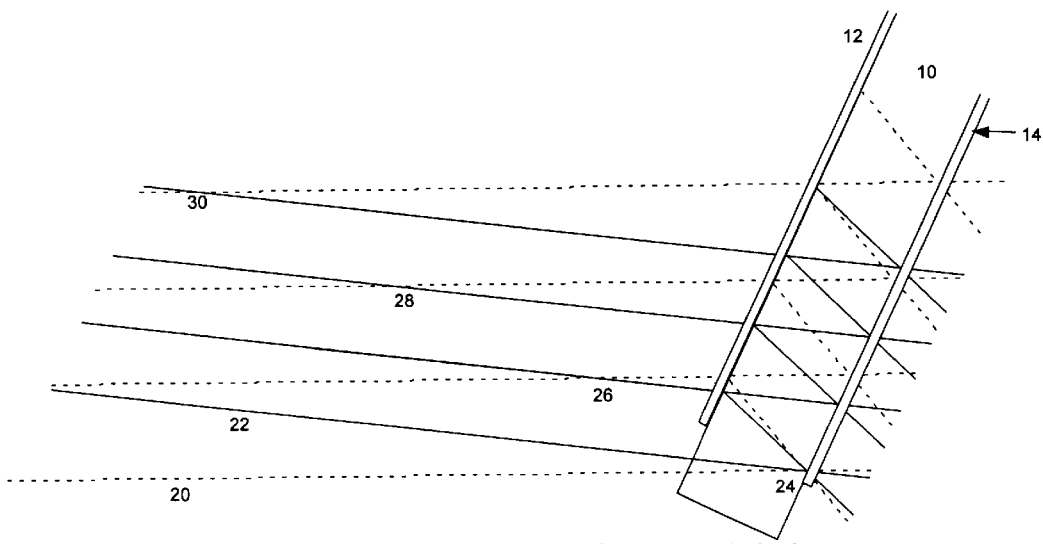
Figure 4. Operation of a prior art VIPA device.

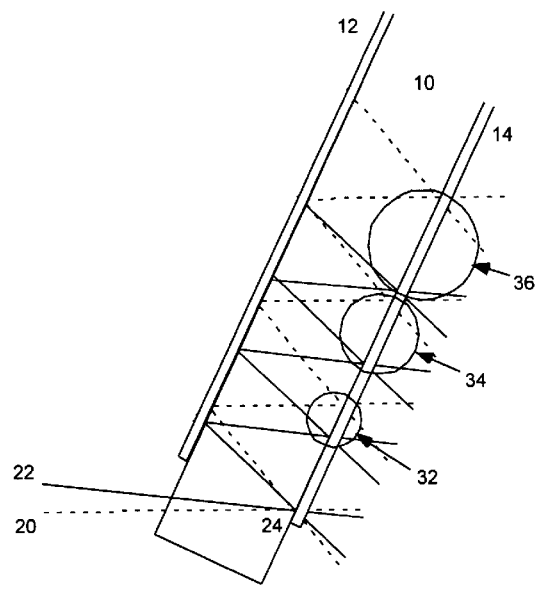
Figure 5. Beam overlap and interference in a VIPA device prior art.
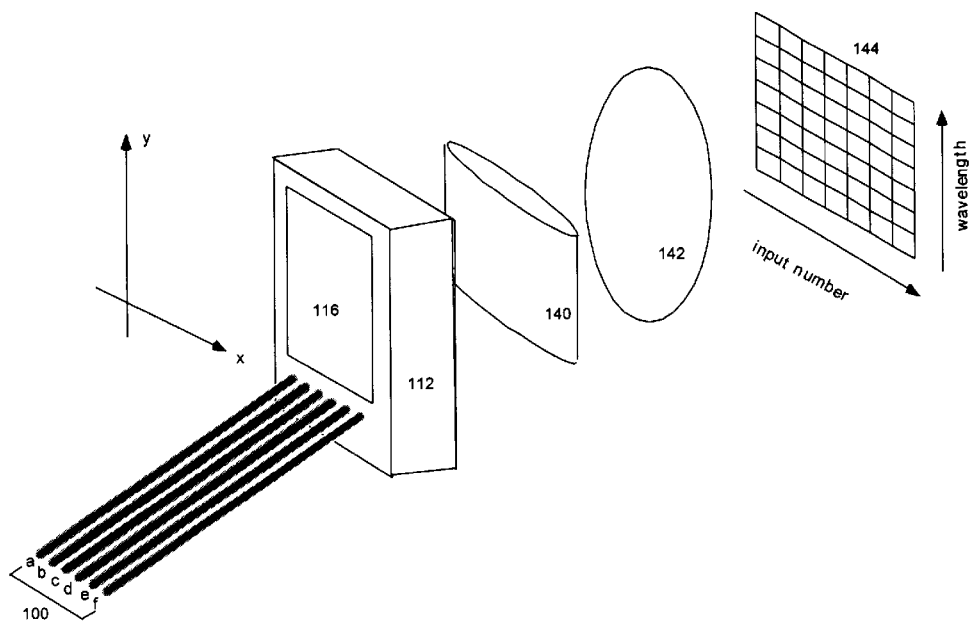
Figure 6. Example embodiment of an Optical Tapped Delay Line (OTDL) channelizer system.

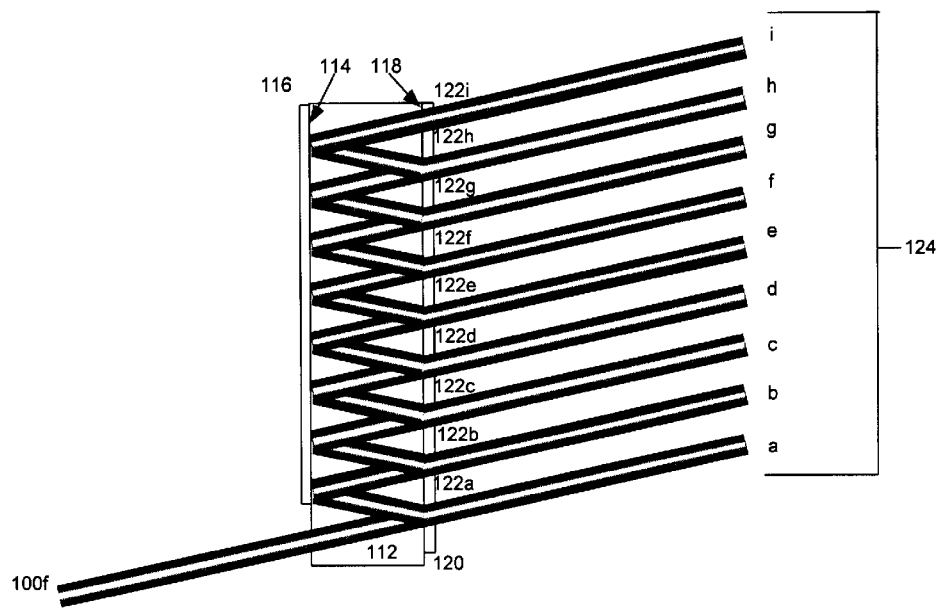
Figure 7. Operational side view of an OTDL device.
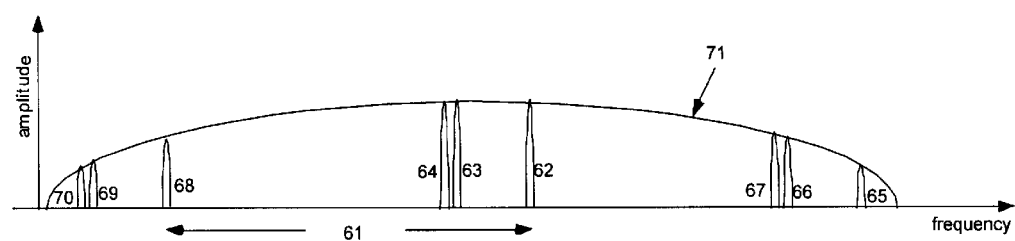
Figure 8. Example optical distribution along the frequency axis of an OTDL channelizer output.

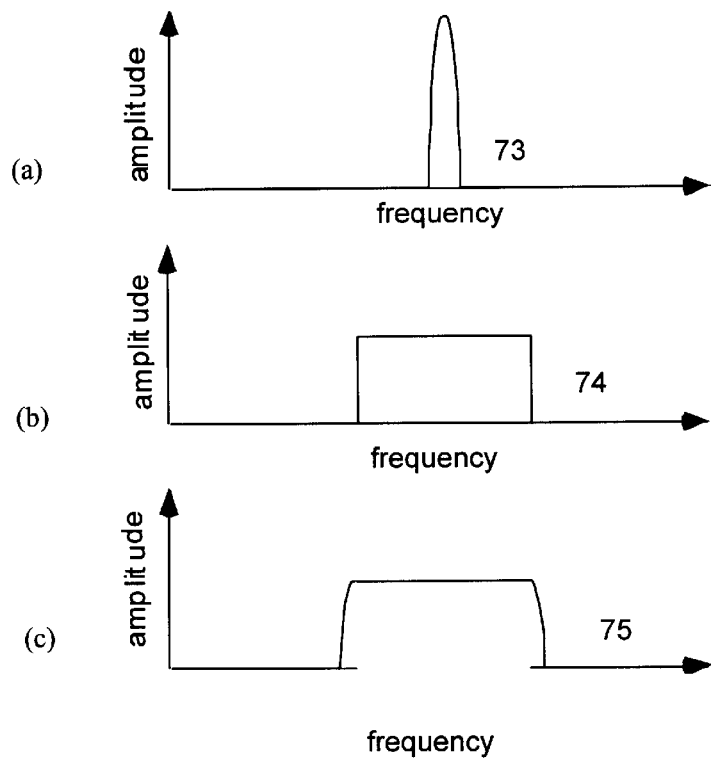
Figure 9. Example channel filter shape for an OTDL channelizer
  a) Optical spot profile in the output plane of a channelizer.
  b) Spatial response of a detector element in the output plane.
  c) Channel filter shape resulting from the convolution of 73 and 74.
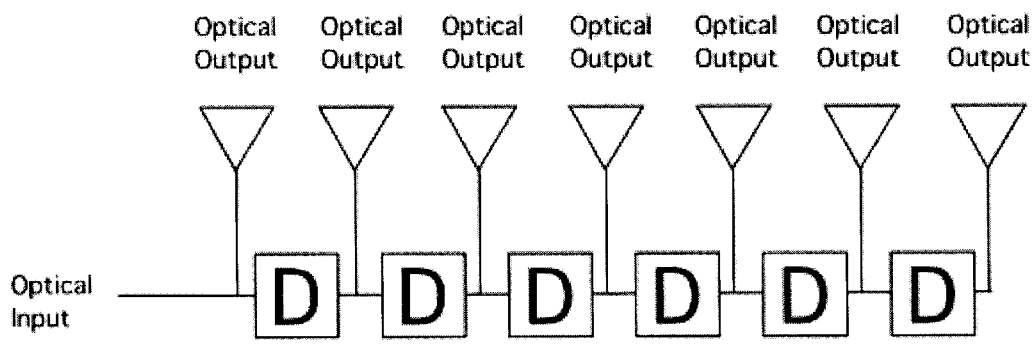
Figure 10. Functional block diagram of an OTDL device shown in a single input arrangement.

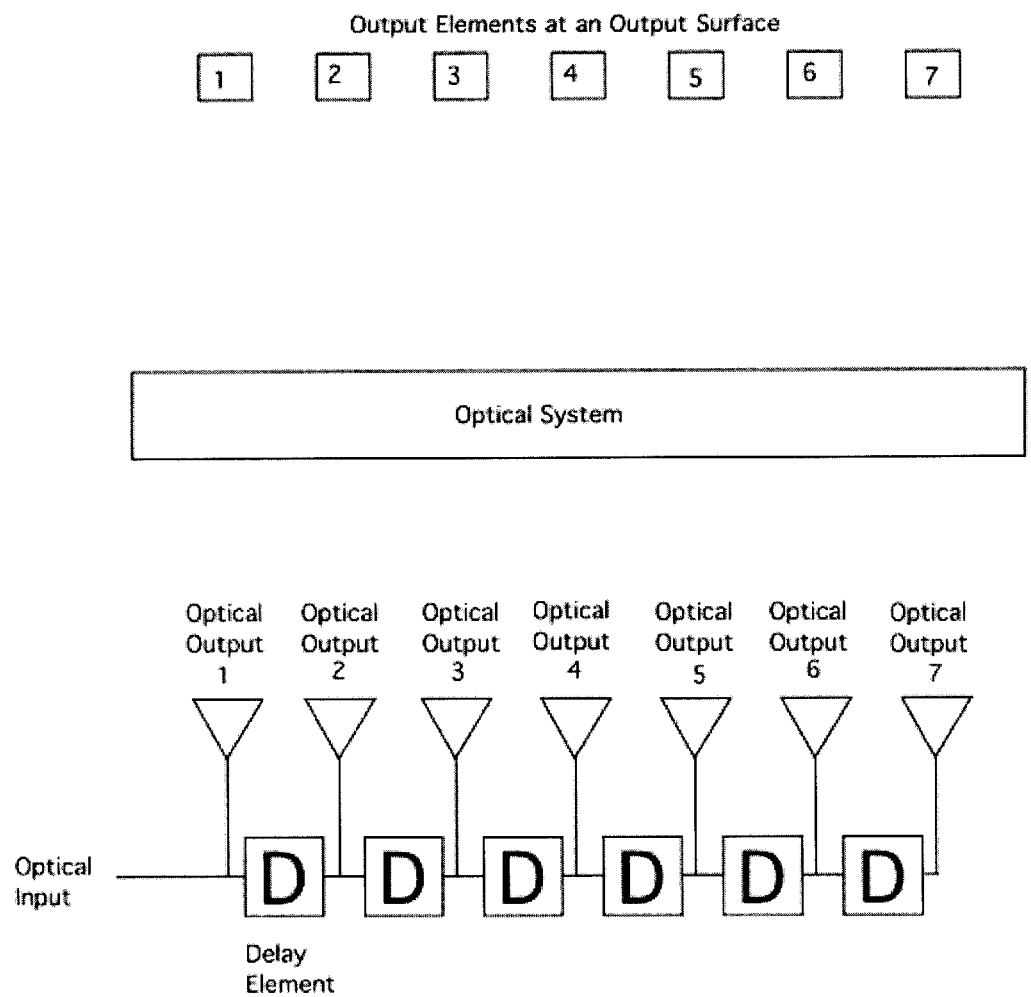
Figure 11. Functional block diagram of an OTDL device including an optical system and output elements at an output surface.

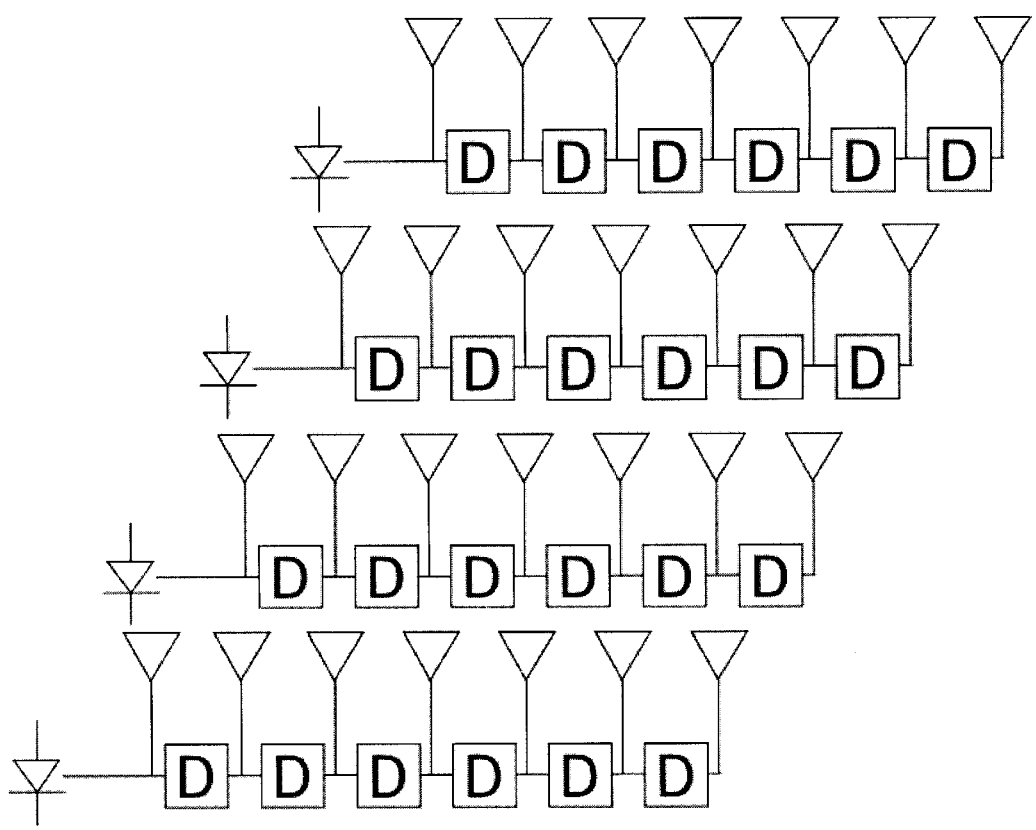
Figure 12. Functional block diagram of an OTDL device shown in a multiple input arrangement.

OPTICAL TAPPED DELAY LINE

This application claims the benefit of provisional application 60/208,894, filed Jun. 2, 2000.

FIELD OF THE INVENTION

The present invention relates to a method and apparatus for communications data transmission using wavelength division multiplexing (WDM). More specifically, the present invention relates to a method and apparatus for enabling hyperfine wavelength division multiplexing (HWDM) by subchannelizing each channel of conventional dense wavelength division multiplexing (DWDM) into many subchannels.

BACKGROUND OF THE INVENTION

Fiber optic cable is widely used for data transmission and other telecommunication applications. However, the relatively high cost of installing new fiber optic cable presents a barrier to increased carrying capacity.

Wavelength division multiplexing (WDM) enables different wavelengths to be carried over a common fiber optic waveguide. WDM can separate the fiber bandwidth into multiple discrete channels through a technique referred to as dense wavelength division multiplexing (DWDM). This provides a relatively low cost method of substantially increasing long-haul telecommunication capacity over existing fiber optic transmission lines.

Techniques and devices are required, however, for multiplexing the different discrete carrier wavelengths. That is, the individual optical signals must be combined onto a common fiber optic waveguide and then later separated again into the individual signals or channels at the opposite end of the fiber optic cable. Thus, the ability to effectively combine and then separate individual wavelengths (or wavelength bands) from a broad spectral source is of growing importance to the fiber optic telecommunications field and other fields employing optical instruments.

Devices that assemble multiple tightly spaced carrier wavelengths within a single fiber are called multiplexers. Devices that separate the carrier wavelengths at the receiving end of a fiber are called demultiplexers or channelizers. The following types of known technologies can be used as WDM channelizers.

Fabry-Perot Interferometer

The Fabry-Perot interferometer is a known device for resolving light into its component frequencies, or equivalently, its component wavelengths. FIG. 1 illustrates one example of a prior art Fabry-Perot interferometer. The illustrated device comprises two mirrors $M_1$ and $M_2$. Each of the two mirrors $M_1$ and $M_2$ is a partially reflecting mirror. The mirrors $M_1$ and $M_2$ are separated by an air space. Alternatively, the Fabry-Perot interferometer device could be made by coating both sides of a transparent plate with a partially reflecting material.

Light from a spectrally broadband source is input at plane $S_1$. Light rays at an angle $\theta$ and a wavelength $\lambda$ undergo multiple reflections between mirrors $M_1$ and $M_2$. The light rays interfere constructively along a circular locus $P_2$ in the output plane $S_2$. The condition for constructive interference that relates a particular angle $\theta$ and a particular wavelength $\lambda$ is given by $$2d\cos\theta = m\lambda$$

where d is the separation of the partially reflecting surfaces, and m is an integer known as the order parameter. The Fabry-Perot interferometer thereby separates the component frequencies of the input light by using multiple beam reflection and interference. It is apparent from the equation above that the output light pattern of the system, i.e., the interference fringes, in the case of a diverging input beam, is a set of concentric circular rings. One ring is present for each wavelength component of the input light for each integer m, with the diameter of each ring being proportional to the corresponding light frequency.

The Fabry-Perot interferometer is not well-suited for use as a WDM channelizer due to the difficulty in obtaining high optical throughput efficiency. If the input beam is divergent, e.g., the direct output of an optical fiber, then the output pattern for a given wavelength is a set of rings. Multiple wavelengths produce nested sets of concentric rings. It is difficult to collect this light efficiently and concentrate it at multiple detector points, or couple it to multiple output fibers, especially while maintaining the separation of wavelength components that the interferometer has produced. If the input beam is collimated, e.g., the collimated output of an optical fiber, then the beam can be fanned over a narrow range of angles to produce only a single-order output (e.g., m =+1) for each wavelength of interest. This fanning makes it easy to concentrate the output light at multiple detector points or fibers, but there is inherently high loss. The throughput efficiency can be no greater than 1/N, where N is the number of wavelength components to be separated.

Lummer-Gehrcke Interferometer

FIG. 2 illustrates an example of a Lummer-Gehrcke interferometer. The illustrated interferometer comprises an uncoated glass plate and a prism for coupling a beam of light into the plate. Internally, the plate is highly reflective at internal incidence angles that approach the critical angle. The internal incidence angle controls the reflectivity of the surfaces. The output of the illustrated Lummer-Gehrcke interferometer is a series of multiple reflected beams that have a frequency-dependent phase shift from beam to beam and that are focused at the output plane by a lens. The interference fringes that are formed at the output plane in the case of a diverging input beam and a particular wavelength $\lambda$ are a family of hyperbolae near the center of the output plane. Each wavelength component of the input beam gives rise to a unique set of hyperbolic fringes.

The Lummer-Gehrcke interferometer relies upon a glass plate that is uncoated. However, the absence of a surface coating means that it is not possible to tailor the fringe intensity profile. This makes the Lummer-Gehrcke interferometer impractical for use in WDM applications in which the fringe profile controls the channel filter shape.

The Lummer-Gehrcke interferometer also is not well-suited for use as a WDM channelizer due to the difficulty in obtaining high optical throughput efficiency. If the input beam is divergent, e.g., the direct output of an optical fiber, then the output pattern for a given wavelength is a family of hyperbolae. Multiple wavelengths produce nested sets of hyperbolae. It is difficult to collect this light efficiently and concentrate it at multiple detector points, or couple it to multiple output fibers, especially while maintaining the separation of wavelength components that the interferometer has produced. If the input beam is collimated, e.g., the collimated output of an optical fiber, then the output pattern for a given wavelength is a set of focused spots corresponding to multiple interference orders. Again, it is difficult to collect this light efficiently, and there is generally an inherent loss. The throughput efficiency can be no greater than 1/N, where N is the number of focused spots per wavelength.

Virtually Imaged Phased Array

FIG. 3 illustrates an example of a Virtually Imaged Phased Array (commonly referred to as a VIPA). The VIPA illustrated in FIG. 3 includes a rectangular glass plate 10 that has a 100% reflective coating 12 on a first side and a partially reflective coating 14 on an opposing side. Light enters the plate 10 below the reflective coating 12 in the form of a focused line source 16 produced by cylinder lens 18.

FIG. 4 illustrates an operational side view of the VIPA. Input light rays 20 and 22 represent the boundaries of the line-focused input beam. The lens 18 focuses the input rays at the point 24, after which the rays diverge as the beam propagates. The focused input rays 20 and 22 are partially reflected by the coating 14 and then totally reflected by the coating 12. This reflection produces a virtual image of point 24 at location 26. The reflective process is continued, producing additional receding virtual images at locations 28 and 30. This process produces virtual images of the line source that recede away from the input side of the glass plate (i.e., to the left of element 10 in FIG. 3) and that are distributed in the y direction.

FIG. 5 illustrates the optical distribution of the diverging light beams at the exit surface of the glass plate. The numbered circles 32, 34 and 36 are intended to call the reader's attention to the areas of interest on the coated surface 14. The circles represent the size of the light beams exiting the plate. The line focused input is illustrated at point 24, the twice reflected light that has diverged due to propagation is illustrated at circle 32, the four-times reflected light that has diverged even more is illustrated at circle 34, and the six-times reflected light that has diverged even more is illustrated at circle 36. In the example illustrated in FIG. 5, after more than six reflections the diverging light beams overlap and blend into an interference pattern.

As shown in FIG. 5, each of the successive beams 32, 34 and 36 that exits the surface 14 of the VIPA plate 10 appears to originate from the line source images 26, 28 and 30, respectively, as shown in FIG. 4. The light from these images diverges as the light propagates inside the glass plate 10. Part of the light from each image exits the plate through the partially reflective coating 14. The exiting beams interfere with each other. The interference pattern is collected by a lens 38 and focused onto a detector array 40 (FIG. 3).

In the illustrated VIPA the beams diverge and overlap at the partially reflective surface 14. This overlap effect makes weighting the individual virtual sources possible only in an area-average sense, thus limiting the degree to which the channel filter shape can be tailored.

The VIPA requires a line-focused input. The line-focused input means that the VIPA may provide a relatively compact device for coarse channelization (i.e., wide channel spacing on the order of one hundred GHz). However, the line-focused input makes the VIPA impractical for fine channelization (i.e., narrow channel spacing on the order of one GHz) due to the fact that a thicker plate is needed, which would result in excessive beam divergence and overlap at the exit surface.

Interference Filters—Thin Film Coatings

Thin film interference filters require a different coating design to separate each wavelength component of an input beam. Since the interference filters produced by thin film coatings tend to have relatively wide passbands, they cannot achieve high resolution (twenty five GHz or finer). These limitations essentially preclude the use of interference filters as viable hyperfine wavelength division multiplexing (HWDM) channelizers.

Classical Diffraction Gratings

In the classical diffraction grating, as used for WDM channelization applications, the dispersive element is a grating embedded in a monoblock of silica. The input optical fibers may be directly fixed to the block. The grating may comprise several tens of grooves to several thousands of grooves per millimeter. The grooves may be fabricated, for example, by etching with a diamond tool or by holographic photo-exposure. The grating diffracts incident light in a direction related to the wavelength of the light, the groove spacing, and the incidence angle. Consequently, an incident beam comprising several wavelength components will be angularly separated into different directions. Conversely, a reverse mode of operation is possible in which several beams of different wavelengths coming from different directions may be combined (multiplexed) into the same output direction.

Diffraction gratings of reasonable size do not have sufficient resolution for HWDM. For example, for a channel separation of 1 GHz, a grating would have to be significantly longer than twelve inches to achieve an adequate channel filter shape. They also have high optical insertion loss, making them inefficient for use in high resolution WDM systems.

Diffraction gratings tend to produce undesirable polarization effects. The diffraction efficiency depends on the polarization of the incident beam. For a given wavelength, this effect increases when the groove spacing decreases. Typically this effect is small when the groove spacing is at least ten times larger than the wavelength, but the effect becomes important when the groove spacing is reduced to a few wavelengths in order to achieve higher angular dispersions.

Arrayed Waveguide Gratings

The arrayed waveguide grating (AWG) is an integrated-optic passive delay line device that performs channelization. The AWG is designed to increase the resolving power, i.e., the fine splitting of the wavelengths, over that obtainable with classical diffraction gratings. AWG's were first proposed around 1990 by Takahashi and others in Japan and by Dragone and others in the U.S. AWG's increase the optical path difference between the diffracting elements by using a waveguide structure equivalent to the well-known Michelson echelon gratings in classical optics. AWG's have the inherent disadvantage of a much smaller free spectral range that limits the total number of channels and increases the near-end crosstalk that affects bidirectionality. It is difficult to achieve resolution better than fifty GHz using an AWG. AWG devices capable of one GHz resolution would be physically large, expensive, and have very high loss.

Fiber Bragg Gratings

A fiber grating is made by recording a Bragg grating in the core of a single-mode fiber that is made photosensitive by doping it with, for example, germanium. This grating may be used as a narrowband filter. It is necessary to use one grating per wavelength channel, so there is an inherent limitation on the number of channels that can be demultiplexed with such devices due to the shear bulk of the resulting system. A primary disadvantage of a fiber grating is that it can reflect only one wavelength. An N channel system therefore requires N fiber gratings.

SUMMARY OF THE INVENTION

The present invention provides a method and device for independently operating on each of one or more optical inputs and producing spatially separated independent optical beams at the output. The spatial separation among the output beams is a function of the frequency components of the corresponding optical input beams. The invention enables the simultaneous channelization of hundreds of discrete input beams into their constituent frequency components.

BRIEF DESCRIPTION OF THE DRAWINGS

A detailed description of some preferred embodiments of the present invention will be made with reference to the accompanying drawings.

FIG. 1 illustrates an example of the operation of a prior art Fabry-Perot interferometer.

FIG. 2 illustrates an example of the operation of a prior art Lummer-Gehrcke interferometer.

FIG. 3 illustrates an example of a prior art VIPA system.

FIG. 4 illustrates an example of the operation of a prior art VIPA device showing the receding images of the focused line source and the interference within the device.

FIG. 5 illustrates an example of the spreading of the optical beams within a prior art VIPA device and the difficulty in weighting the individual beams to shape the output channel filter.

FIG. 6 illustrates an example of an Optical Tapped Delay Line (OTDL) in accordance with the present invention.

FIG. 7 illustrates an example of an operational side view of an OTDL device in accordance with the present invention.

FIG. 8 illustrates an example of the optical output distribution along the frequency direction (i.e., the wavelength direction in FIG. 6) corresponding to a single input beam for an OTDL device in accordance with the present invention.

FIG. 9 illustrates an example of the optical frequency response of a channel of an OTDL device in accordance with the present invention.

FIG. 10 illustrates an example of a schematic block diagram of the functional operation of a device such as that shown in FIG. 6 in a single-input arrangement.

FIG. 11 illustrates an example of a schematic block diagram of the functional operation of a device such as that shown in FIG. 6 in a single-input arrangement, including an optical system and output elements at an output surface.

FIG. 12 illustrates an example of a schematic block diagram of the functional operation of a device such as that shown in FIG. 6 in a multiple-input arrangement.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

FIGS. 6 and 7 illustrate a preferred embodiment of an OTDL device in accordance with the present invention. In the illustrated example, six collimated input beams $100a$–$100f$ enter a transparent plate 112. The origin of the beams may be, for example, the collimated outputs of six optical fibers (not shown) where each fiber typically carries multiple wavelength channels. The plate 112 has a first surface 114 that is provided with a coating 116 that is substantially 100% reflective. The plate 112 has a second surface 118 that is spaced from and opposed to the first surface 114. The second surface 118 is provided with a coating 120 that is partially reflective.

In the illustrated embodiment, the partial reflectivity of the second surface coating 120 is spatially varying. In an alternative embodiment (not illustrated), the partial reflectivity of the second surface coating 120 may be substantially uniform.

In the illustrated embodiment, the reflective surface coatings 116 and 120 are separated by a glass plate 112. In alternative embodiments (not illustrated), the reflective surfaces may be separated by other transparent materials, including empty space. The element 112 may also be referred to as an optical cavity.

FIG. 7 illustrates an operational side view of the device shown in FIG. 6. The single input beam $100f$ illustrated in FIG. 7 corresponds to the input beam $100f$ illustrated as one of the multiple input beams $100a$–$f$ in FIG. 6. Due to the perspective of FIG. 7 the other input beams $100a$–$e$ are not illustrated. However, it will be understood that the other multiple input beams $100a$–$e$ reside behind the input beam $100f$ in the view shown in FIG. 7, and that the device is capable of processing and channelizing all of the multiple input beams simultaneously.

Referring to FIG. 7, the input beam $100f$ enters the cavity 112 as a collimated beam of light. Focusing of the input beam is not required. After entering the cavity 112, a portion of the collimated input beam exits the cavity at a first location or "tap" $122a$ as collimated output beam $124a$. Another portion of the collimated input beam is partially reflected by the coating 120 and then totally reflected by the coating 116. In other words, a portion of the beam "bounces" from the coating 120 to the coating 116 and then back. This reflection or "bounce" produces a collimated output beam that exits at a second location or tap $122b$ that is slightly displaced spatially from the first tape $122a$. As a result of the bounce, the distance traveled by the output beam $124b$ is slightly greater than the distance traveled by output beam $124a$. The width of the optical cavity 112 between reflective surfaces 116 and 120 thereby introduces a slight time delay between adjacent taps. The reflective process is continued, producing multiple additional collimated output beams $124a$–$i$ exiting the cavity 112 at multiple tap locations $122a$–$i$. The result is a series of output beams that are distributed in the y direction with a progressive time delay from beam to beam. Although not illustrated in FIG. 7, it will be recognized that a similar series of output beams distributed in the y direction may be simultaneously produced for each one of the input beams $100a$–$f$. In other words, the device is capable of operating on each one of the multiple collimated input beams independently of the other input beams. The device therefore may be referred to as a "two dimensional" device, in the sense that the device uses two different spatial dimensions to perform signal processing functions. A first dimension x accommodates multiple independent collimated input beams that are all independently channelized along a second dimension y.

The various beams remain substantially collimated throughout the reflective process. Divergence of the beams and interference among the beams is minimized. Numerous internal reflections within the cavity 112 may be achieved without substantial divergence or interference.

In the embodiment shown in FIG. 6, the various output beams are then directed to an anamorphic optical system 140, 142 that is spaced from the optical cavity 112. In the illustrated embodiment the anamorphic optical system comprises a cylinder lens 140 and a spherical lens 142. The anamorphic optical system 140, 142 performs the functions of: 1) Fourier transformation of the output of the cavity 112 in the vertical dimension y, and 2) imaging of the output of the cavity 112 in the horizontal dimension x onto an output surface 144. Although not illustrated in FIG. 6, it will be recognized that the optical system 140, 142 may have some form other than anamorphic as described above, depending on the particular application of the OTDL device. The functions performed may be, for example, Fourier transformation in both dimensions, partial or fractional Fourier transformation in one or both dimensions, imaging, or any combination of these functions.

The output surface 144 illustrated in FIG. 6 is two dimensional. The horizontal dimension x of the output surface 144 corresponds to the input beam index. The vertical dimension y corresponds to the wavelength of the light in the input beam. There are a wide variety of devices that might be positioned at the output surface 144. For example, a detector array, a lenslet array, a light pipe array, a fiber optic bundle, an array of GRIN lenses or any combination of the above may be positioned at the output surface 144.

The operation of the embodiment of the OTDL device shown in FIG. 6 may be better understood by reference to FIG. 10. FIG. 10 is a schematic block diagram illustrating an example of the functional operation of a device such as that shown in FIG. 6. The multiple delay elements that are schematically illustrated by the boxes labeled "D" in FIG. 10 correspond to the plurality of bounces between reflective surfaces 116 and 120 that occur in the cavity 112 shown in FIG. 6. Each of the delay elements D imposes a small, additional time delay upon the optical input. At each element D the delayed optical input is tapped to produce a corresponding optical output.

Referring to FIG. 10, if the frequency of the optical input is such that there is a $2n\pi$ radian phase shift (where n is an integer) between adjacent optical outputs, then all of the optical outputs will be in phase. If all of the optical outputs are in phase, then the coherent sum of the optical outputs results in a plane wave that propagates in a direction that is perpendicular to the line containing the optical outputs and is lying in the plane of the page of FIG. 10. We define this direction to be the optical axis of the system.

If the frequency of the optical input is then slightly increased (or decreased), there will be a corresponding change in phase shift from optical output to optical output. This change in phase shift will cause the plane wave to propagate at an angle relative to the optical axis.

If the frequency of the optical input is increased (or decreased) even further, then the angle will also increase (or decrease) until the phase shift from optical output to optical output reaches $2(n+1)\pi$ radians. At that point the plane wave will again propagate in the direction of the optical axis.

FIG. 11 is a schematic block diagram illustrating an example of the functional operation of a device corresponding to the device illustrated in FIG. 6, including the anamorphic optical system 140, 142 and output surface 144. The optical system performs a Fourier transformation that converts a plane wave propagating at a given angle with respect to the optical axis into a focused optical spot on one of the output elements at the output surface. The output elements may be photodetectors, optical fibers, or any other optical element.

FIG. 12 is a schematic block diagram illustrating an example of the functional operation of a device such as that shown in FIG. 6 in a multiple-input arrangement. The schematic is a multiple-input version of the functional block diagram shown in FIG. 10. Here the optical input sources are shown as diodes. All other functional blocks are the same as in FIG. 10. FIG. 12 illustrates the ability to process multiple optical inputs simultaneously.

Mathematical Theory of Operation

The following paragraphs are directed to a discussion regarding the mathematical theory of operation of the OTDL. This discussion is not to be taken in a limiting sense, but is made for the purpose of describing the inventors' present understanding of the mathematical theory underlying the operation of the invention.

Assumptions: The mathematical theory of operation of the OTDL is more easily understood if certain simplifying (but realistic) assumptions are made with reference to the embodiment shown in FIGS. 6 and 7. These assumptions include the following.

1) The diameter of the input beam is sufficiently large such that the beam profiles of the output beams 124$a$–$i$ are approximately the same.
2) There is no phase shift associated with the transmission or reflection from either of the reflective surface coatings 116 and 120.
3) There is no loss in the reflective surface coatings 116 and 120.
4) The first reflective surface 116 is totally reflective.
5) The transmittance and reflectance of the surface coatings 116 and 120 are constant over the input beam profile.

None of these assumptions are required for the invention to work. However, they greatly simplify the mathematical theory of operation. As these assumptions are relaxed, the mathematical theory becomes more complex, but the basic principles of operation remain the same.

Definitions: The quantities, variables, and functions used in the mathematical theory are defined below.

Let a be the peak input signal amplitude.

Let x and y be continuous spatial coordinates in the horizontal and vertical directions, respectively. x is normalized to the input beam spacing, and y is normalized to the output tap spacing. Therefore, the values of x and y are whole numbers at the tap centers, and at these points x and y are interpreted as the input beam number and tap number, respectively.

The distance x in meters is the normalized x times the input beam spacing in meters.

The distance y in meters is the normalized y times the output tap spacing in meters.

Let $b(x,y)$ be the input beam complex amplitude profile.

Assume that $b(x,y)$ is separable, i.e., $b(x,y)=b_x(x)b_y(y)$. (This assumption is not required but it simplifies the mathematics.)

Let $\tau$ be the time delay between adjacent output beams, e.g., 124$a$ and 124$b$.

Let d be the spacing between adjacent output beams, e.g., 124$a$ and 124$b$, in units of length.

Let m be the total number of taps in the y direction.

Let $f(x)$ be the optical frequency components in the input beam at position x.

Let $p(x,y)$ be the envelope of the optical distribution of the sum of all the output beams 124$a$–$i$ at the output of plate 112.

Let δ be the Dirac delta function.

Let * represent the convolution operation.

Let $F_y$ be the Fourier Transform operator in the y direction.

Let t(x,y) be the amplitude transmission coefficient of the partially reflective coating 120.

Let T(x,y) be the corresponding power transmittance: $T(x,y)=|t(x,y)|^2$.

Let r(x,y) be the amplitude reflection coefficient of the partially reflective coating 120.

Let R(x,y) be the corresponding power reflectance: $R(x,y)=|r(xsy)|^2$.

(Note that for a lossless coating 120 conservation of energy demands that T(x,y)+R(x,y)=1.)

Let c(x,y) be the complex amplitude of the output beam at location (x,y). The "c's" represent the tap weights in the optically tapped delay line.

Theoretical Development: Expressions for the output beams at the tap centers where y is equal to a whole number can be written as follows.

output beam 124a: c(x,0)=a b(x,0) t(x,0), (by assumption 5)

output beam 124b: $c(x,1)=a\ b(x,0)\ r(x,0)\ t(x,1)\ e^{j2\pi f(x)\tau}$ output beam 124c: $c(x,2)=a\ b(x,0)\ r(x,0)\ r(x,1)\ t(x,2)\ e^{j2\pi f(x)2\tau}$, and so on.

In general, the output beam at the center of the $n^{th}$ tap, c(x,n), can be written as $$c(x,n) = ab(x,0)t(x,n)e^{j2\pi f(x)n\tau}\prod_{j=0}^{n-1} r(x,j)$$

In general, the magnitude of c(x,n) is some function of n, |c(x,n)|=w(n). The values w(n) are the tap weights, and generally the weights are selected to control the channel filter shape of the system. One example of the calculation of the tap weights is a uniform set of weights, w(n)=1. For a uniform set of tap weights |c(x,0)|=|c(x,1)|=|c(x,n)|=1.

For high efficiency it is desirable to have no optical loss. This implies that all remaining light will be transmitted out of the plate 112 at the last tap. Let m be the index of the last tap. This gives the condition t(x,m)=1.

The case for which the tap weights are uniform gives the condition |c(x,n)|=|c(x,n—1)|, for all n. In terms of the amplitude transmission and reflection coefficients this condition implies that $$t(x,n)\prod_{j=0}^{n-1} r(j) = t(x,n-1)\prod_{j=0}^{n-2} r(j)$$

This equation can be rewritten in terms of the power transmittance as $$T(n) = \frac{T(n-1)}{1-T(n-1)}$$

The transmittance at the second tap T(1) in terms of that at the first tap T(O) is $$T(1) = \frac{T(0)}{1-T(0)}$$

The transmittance at the third tap is $$T(2) = \frac{T(1)}{1-T(1)} = \frac{T(0)}{1-2T(0)}$$

By induction, the transmittance at the $n^{th}$ tap T(n) can be shown to be $$T(n) = \frac{T(0)}{1-nT(0)}$$

This equation gives the power transmittance of the coating 120 at the tap locations n in terms of T(0) at the first tap.

We know that for a lossless system T(m)=1. Setting T(m)=1 in the equation above and solving for T(0) we have $$T(0) = \frac{1}{1+m}$$

This equation sets T(0) based on the number of delay line taps desired. The previous equation gives all of the other T values based on T(0). The transmittance of the coating is now fully defined for the case of uniform tap weights, i.e., w(n)=1.

Each output tap is now weighted uniformly, and the output of the plate 112 can be written as an array of point sources where each source is shaped by the beam profile b(x,y). The complex amplitude distribution at the output of plate 112 in the plane just to the right of coating 120 is given by $$g(x,y) = a\frac{b(x,y)}{1+m} * \sum_{l}\sum_{p=0}^{m-1} e^{j2\pi f(x)p\tau}\delta(l-x, p-y)$$

The complex amplitude distribution at the output of the system (plane 144 in FIG. 6) after Fourier transformation in y and imaging in x is given by $$G(x, f_y) = F_y\left\{a\frac{b(x,y)}{1+m} * \sum_{l}\sum_{p=0}^{m-1} e^{j2\pi f(x)p\tau}\delta(l-x, p-y)\right\}$$

where x is the beam index for an input beam, y is the tap index, and $f_y$ is the spatial frequency coordinate that corresponds to the wavelength direction in plane 144 (FIG. 6), or equivalently, the frequency axis (FIG. 8). For each frequency component contained in f(x) there is a different phase shift from tap to tap. If all of the taps at a given x for a given frequency component are in phase, then the output beam propagates along the optical axis. If the frequency is increased such that from the first tap to the $m^{th}$ tap the phase shift has progressed by one cycle (2π radians) over the aperture, then the focused output spot at plane 144 has moved by one resolution element, i.e., by one spot width.

This means the limiting frequency resolution is the reciprocal of the total delay time mt of the device, $$\Delta f = \frac{1}{m\tau}$$

The time delay between adjacent taps is r, therefore, the focused output spot pattern is repeated at a frequency interval of $$f_R = \frac{1}{\tau}$$

This means that a device with m taps will have a limiting frequency resolution equal to the reciprocal of the total time aperture of the device, and an unambiguous frequency range equal to the reciprocal of the tap to tap time delay. Therefore, the device will produce m distinct outputs, i.e., m distinct wavelength channels.

An example of the optical distribution at plane 144 in the frequency axis at a given position x is illustrated in FIG. 8. The spectral lines at positions 62, 63 and 64 represent three distinct wavelength channels, and these lines are repeated at positions 65, 66 and 67 and at positions 68, 69 and 70. The spacing of the replications 61 in terms of temporal frequency is equal to the reciprocal of the time delay between taps 1/τ, as defined above, and the spacing in terms of spatial frequency is equal to the reciprocal of the distance between taps 1/d.

The shape of a spectral line for a perfect single frequency input (i.e., a pure single wavelength) is the Fourier transform of the envelope of the output beams $F_y\{p(x,y)\}$. For example, in the case of a uniform envelope the shape is a sin(x)/x function. Conversely, the envelope of the optical distribution at the output of the channelizer (plane 144) at a given beam position x is the Fourier transform of the y component of the beam profile b(x,y) in the y-axis, an example of which is curve 71 in FIG. 8, and the image of the x component of b(x,y) in the x-axis, or $b(x)F_y\{b_y(y)\}$.

The frequency response of a single detector element or an optical fiber positioned at plane 144 is illustrated in FIG. 9. FIG. 9a, at the top, is the amplitude profile of a focused spot 73 at the detector plane in the $f_y$ direction corresponding to a single frequency input. The spatial response 74 of a detector element or fiber pickup is illustrated in FIG. 9b. The resulting frequency response 75 is the convolution of 73 and 74 and is shown in FIG. 9c. The effect of the optical spot shape 73 is to smooth the edges of the detector response 74 and produce the channel filter shape 75 with width approximately equal to the sum of the widths of 73 and 74.

Application of the OTDL Device to WDM Communication Systems

An OTDL device in accordance with the present invention is applicable to telecommunications data transmission using WDM. An OTDL device in accordance with the present invention enables HWDM by subchannelizing each channel of conventional DWDM into many subchannels.

Frequency Resolution: As used herein, the term "resolution" has the same meaning as the phrase "channel spacing." The modulated signal bandwidth of an optical carrier in a given channel cannot exceed the channel spacing. Therefore, the maximum modulated signal bandwidth is roughly equal to the channel spacing. For example, if a larger modulated bandwidth is desired, then greater channel spacing is required. An OTDL device can be designed for virtually any channel spacing that is required by a particular communication system design.

The term "resolution" refers to the channel spacing between adjacent carrier wavelengths, such as carrier wavelengths 63 and 64 in FIG. 8. The channel spacing may be expressed either in units of wavelength (i.e. meters) or, alternatively, in units of temporal frequency (i.e. cycles per second or Hz).

The practical lower limit on channel spacing for DWDM equipment is approximately 50 GHz. In contrast, an OTDL device in accordance with the present invention provides subchannel spacing on the order of 1 GHz or less. Therefore, an OTDL device in accordance with the present invention provides on the order of 50 times more channels per fiber, and the additional channels equate to at least a ten-fold increase in the bandwidth utilization of the fiber and thus increased data transmission capacity. The limiting resolution of an OTDL device may be calculated as 1/mτ where m represents the number of optical tap outputs and r represents the tap to tap delay time. An OTDL device in accordance with the present invention is able to provide a resolution that is at least two orders of magnitude finer than the resolution currently achievable with competing technologies that are applicable to WDM.

For example, an OTDL device with an optical cavity thickness of one cm and that is designed for one hundred "bounces" between reflective surfaces will provide a total delay length of one meter. The time required for light to propagate a distance of one meter in glass is about five nanoseconds. Such a time delay corresponds to a frequency resolution of about two hundred MHz. Similarly, an OTDL device that is designed for five hundred "bounces" would provide a resolution of about forty MHz.

An OTDL device in accordance with the present invention may be used in combination with a conventional DWDM channelizer to subchannelize each DWDM channel into many HWDM channels. This subchannelization would enable fiber telecommunications service providers to sell bandwidth in smaller units, thereby increasing total revenue for an installed fiber. Customers might lease a wavelength in this optical layer, instead of leasing the right to transmit at a specific data rate. A television station, for instance, could reserve one wavelength from its studio to its transmitter and another to the local cable company, and transmit both signals in digital video formats not used on the telephone network.

An OTDL device in accordance with the present invention provides relatively higher frequency resolution. This in turn enables the spectral region between existing optical carrier frequencies in DWDM systems to be used more effectively, thereby significantly improving the fiber bandwidth utilization and thus the data throughput capacity on a single fiber.

The higher resolution provided by an OTDL device enables a high bandwidth channel to be subdivided into many lower bandwidth channels (on the order of one GHz or lower). This permits lower cost signal demodulation terminals using low-bandwidth optical detectors and electronics.

The higher resolution provided by an OTDL device increases the number of independent optical wavelength carriers that can be used in a fiber communication system. Instead of 40 or 80 channels there can be 4000 to 40,000 channels (wavelengths) allowing each user to have their own independent wavelength. An OTDL device thereby enables large "one wavelength per user" passive optical networks.

The higher resolution also permits the possibility of transmitting a wideband signal as many narrowband signals in parallel. Many parallel channels permit the network management system to provide "bandwidth on demand" by allocating various HWDM channels to users as needed. With more optical carriers available the network manager can allocate more parallel channels to users that have a momentary need for higher capacity.

In conventional WDM systems, a single wavelength channel carries diverse traffic format types (e.g., Ethemet, ATM, POS) all in their native format. An OTDL device enables the dedication of channels to certain types of formats, something that is impractical with current fiber communication system architectures.

An OTDL device in accordance with the present invention is capable of generating relatively large time delays, on the order of several nanoseconds or more. Such an OTDL device therefore tends to be very sensitive to relatively small changes in frequency. Consequently, a device in accordance with the present invention may be used to produce very high resolutions—on the order of 10 GHz and finer.

Channel Filter Shape: The channel filter shape of an OTDL device is relatively easy to control. This shaping enables a higher percentage of the available bandwidth of a fiber to be used. This ease of control is a result of the use of a collimated light beam input to plate 112. The beam at each tap on coating 120 is confined to a small area on the coating. This area is different for each of the taps. Therefore, each output beam can be individually weighted in amplitude and phase. This weighting of each tap permits precise control of the shape of the optical spot at the output of the device. This means accurate filter sidelobe control and the ability to pack channels closer together, increasing transmission capacity.

Optical Throughput Efficiency: The efficiency of an optical system like OTDL may be defined as the fraction of light power that is input to the system in a single wavelength channel in a single input beam that is ultimately focused at a single, detectable location in the output plane. Using this definition, an efficiency of 40%, for example, means that 40% of the original input light power is focused in one spot, and that the remaining 60% is lost or wasted because it either appears in the higher-order replicated spots or is scattered by imperfections in the optical components. Efficiency may be measured simply by measuring the input and output light powers at a given wavelength and computing their ratio. In the present invention efficiencies on the order of 40% and greater, and in some cases efficiencies on the order of as much as 70% and greater, may be achieved with a frequency resolution of 10 GHz or finer.

Comparison with the VIPA Device: An OTDL device in accordance with the present invention provides a number of advantages when compared with other devices that are known in the art. For example, an OTDL device in accordance with the present invention does not require the use of a focused input beam, as is required in a VIPA device. Such a focused beam in a VIPA device tends to rapidly diverge after focus when propagating in a thick optical cavity (i.e., a thickness on the order of several millimeters or greater) and is quickly truncated by the edges of the device. The rapid divergence of the focused input beam in a VIPA device also makes control of the amplitude, i.e., the weighting, of the individual virtual images difficult. The use of relatively large diameter, collimated input beams in the present invention enables the use of a relatively thick cavity. A thick cavity is needed to produce a relatively long total delay time inside the plate 112 in order to achieve high frequency resolution.

Two-dimensionality. An OTDL device in accordance with the present invention is two dimensional. One of the two spatial dimensions allows for multiple parallel inputs. Consequently, a single OTDL device in accordance with the present invention is capable of simultaneously operating on hundreds of independent inputs.

In an alternative embodiment of the invention that exploits this two dimensionality, a first OTDL device and a second OTDL device may be cascaded in the z axis direction, i.e., along the optical axis, with the output of the first OTDL device serving as the input of the second OTDL device. In addition, the second OTDL device may be rotated about the z axis by ninety degrees relative to the first OTDL device, thereby providing what may be called a "crossed" embodiment.

In such a crossed embodiment the first OTDL device may perform a coarse, low-resolution channelization. The second OTDL device may perform a fine, high-resolution channelization. The crossed embodiment may be used, for example, in a communication system where there is a single fiber carrying hundreds or even several thousand carrier wavelengths or channels, as opposed to tens of fibers carrying fifty to one hundred channels each. The crossed OTDL devices could channelize all the wavelengths emitted from this single fiber, and the wavelengths would be spatially separated at the output plane. A pair of crossed OTDL devices can channelize the entire bandwidth of a fiber to In high resolution (i.e., one GHz or less).

Reversibility: The OTDL device in accordance with the present invention is reversible. In other words, an OTDL device in accordance with the present invention may be used to multiplex many inputs at different frequencies (carrier wavelengths) into a single output. The reverse mode of operation may be achieved by inputting appropriate multiple frequencies of light at appropriate locations in the output plane 144 of the device. The light emitted from these input sources will propagate backward through the system shown in FIG. 6 and combine in plate 112 and ultimately appear at a common input port of the device.

Referring to the OTDL device illustrated in FIGS. 6 and 7, for example, a diverging light source that is of the appropriate frequency and that is input at the proper location in plane 144 may be efficiently coupled into the appropriate beam 110*a–f*. A plane wave produced by the optical system (as a result of the incident diverging beam) of appropriate frequency and appropriate angle incident on surface 118 of plate 112 will produce an output at the optical input port. The incident plane wave results in the contributions from each output tap being in phase and adding constructively.

An OTDL device in accordance with the present invention may therefore function as a multiplexer or as a demultiplexer, for combining or separating multiple wavelength channels, respectively. The use of collimated light beams in the device and the control of the weight at each optical tap on the delay line make the device relatively efficient in both forward and reverse modes of operation, i.e., the demultiplexer and multiplexer modes, respectively.

Application of the OTDL Device to Optical Signal Processing

An OTDL device in accordance with the present invention may be used as a replacement for a Bragg cell in optical signal processing applications.

A Bragg cell (also known as an acousto-optic cell or AO cell) is a device used to convert an electrical signal into an optical format in many optical processors. For example, the "channelizer" aboard the SWAS (Short Wavelength Astronomical Spectrometer) spacecraft utilizes a Bragg cell. A Bragg cell comprises an electrical-to-acoustic transducer bonded to a block of transparent material. An electrical signal is applied to the transducer causing the transducer to vibrate. The vibrations are coupled into the transparent block as a traveling sound wave. The sound wave comprises a series of compressions and rarefactions in the block which spatially modulate the index of refraction of the block. If the block is illuminated with light, then the index modulations scatter the light. For example, if the sound wave is sinusoidal, then the index modulations are sinusoidal and act as a diffraction grating. The higher the frequency of the electrical signal, the higher the spatial frequency of the diffraction grating and the greater the angle at which the light is scattered (diffracted). This diffraction process permits the electrical signal to be decomposed into an angular spectrum of optical plane waves. The angular spectrum can be focused to a plane to perform a spectrum analysis of the electrical signal.

The Bragg cell is limited in frequency bandwidth to about two GHz by acoustic attenuation and transducer fabrication technology. There is also a nonlinear effect that limits the useful diffraction efficiency to less than ten percent for many applications. This effect was quantified by David Hecht and is called the Hecht limit. The Hecht limit is a result of the generation of intermodulation products within the Bragg cell.

In contrast, an OTDL device in accordance with the present invention does not suffer from acoustic attenuation. Therefore an OTDL device in accordance with the present invention can be much wider in frequency bandwidth. For example, the bandwidth for an OTDL device in accordance with the present invention can be greater than two hundred GHz, in contrast to the two GHz that is typical for a Bragg cell.

An OTDL device in accordance with the present invention provides relatively smaller aperture times, i.e., the total delay time $m\tau$, by a factor of about one hundred as compared to a Bragg cell. This enables more rapid random angular beam positioning in beam steering applications.

An OTDL device in accordance with the present invention does not suffer from the Hecht limit that describes nonlinear interactions in Bragg cells. An OTDL device in accordance with the present invention does not use volumetric index of refraction modulation, and therefore is not limited in optical throughput efficiency by the Hecht limit. High optical efficiency is possible without generating intermodulation products. An OTDL device in accordance with the present invention can theoretically achieve 100% efficiency.

Multiple input Bragg cells are extremely difficult to fabricate reliably due to electromagnetic and acoustic interactions between the inputs. In contrast, each input of a multiple input OTDL basically needs only an additional optical input with a properly collimated and oriented beam. Homogeneity and clarity of the optical material of plate 112 is also desirable to minimize crosstalk.

An OTDL device in accordance with the present invention may be advantageously used for wideband spectrum analysis of signals, correlation of signals, and optical beam scanning. An OTDL device is particularly applicable to interferometric cross power spectrum analyzers, radiometer banks and electronic warfare receivers.

What is claimed is:

1. A device comprising a processor for processing at least one collimated input beam to produce discrete multiple time-delayed output beams that interfere at a plane, the input beam comprising at least one frequency, the discrete multiple time-delayed output beams being mutually phase-shifted as a function of the at least one frequency of the input beam and being spatially distributed by the processor such that each of the discrete multiple time-delayed output beams occupies a different region and is individually weightable in complex amplitude, the processor comprising an optical tapped delay line and an optical system configured to enable the multiple time-delayed output beams to interfere at the plane, whereby the at least one input beam is channelized into constituent frequencies at the plane.

2. The device of claim 1, wherein the processor comprises:

a first reflective surface, and a second reflective surface, the second reflective surface having a reflectivity of less than 100%, the first reflective surface and the second reflective surface being in spaced relationship, whereby at least a portion of a beam directed toward the second surface is reflected multiple times between the first and second surfaces, thereby producing multiple time-delayed output beams exiting the second surface.

3. The device of claim 2, comprising:

an optical system for operating on the multiple time-delayed output beams exiting the second surface to channelize the at least one input beam into constituent frequencies.

4. The device of claim 3, wherein the optical system comprises:

an anamorphic optical system for Fourier transforming the multiple time-delayed output beams exiting the second surface in a first dimension and imaging the multiple time-delayed output beams exiting the second surface in a second dimension onto an output surface.

5. The device of claim 2 wherein the first reflective surface and the second reflective surface define an optical cavity, the optical cavity being at least partially occupied by at least one transparent material.

6. The device of claim 2, wherein the reflectivity of the second surface is spatially varying.

7. The device of claim 2, wherein the reflectivity of the second surface is substantially uniform.

8. The device of claim 1, comprising: an optical system for operating on the discrete multiple time-delayed output beams to channelize the at least one input beam into constituent frequencies.

9. The device of claim 1 comprising a processor having an output plane, wherein the input beam has a profile, wherein the profile includes a complex amplitude distribution, and wherein the processor enables the profile to be controlled to produce a spectral envelope weighting over the output plane of the processor.

10. A device comprising a processor for processing a plurality of collimated input beams to produce discrete multiple time-delayed Output beams that interfere at a plane, each of the input beams comprising at least one frequency, the discrete multiple time-delayed output beams being mutually phase-shifted as a function of the at least one frequency of a corresponding input beam and being spatially distributed by the processor such that each of the discrete multiple time-delayed output beams occupies a different region and is individually weightable in complex amplitude, the processor comprising an optical tapped delay line and an optical system configured to enable the multiple time-delayed output beams to interfere at the plane, whereby the plurality of collimated multiple input beams are simultaneously channelized into constituent frequencies at the plane.

11. The device of claim 10, wherein the processor comprises:

a first reflective surface, and a second reflective surface, the second reflective surface having a reflectivity of less than 100%, the first reflective surface and the second reflective surface being in spaced relationship, whereby at least a portion of a beam directed toward the second surface is reflected multiple times between the first and second surfaces, thereby producing multiple time-delayed output beams exiting the second surface.

12. The device of claim 11, comprising:

an optical system for operating on the multiple time-delayed output beams exiting the second surface to channelize at least one corresponding input beam into constituent frequencies.

13. The device of claim 12, wherein the optical system comprises:

an anamorphic optical system for Fourier transforming the multiple time-delayed output beams exiting the second surface in a first dimension and imaging the multiple time-delayed output beams exiting the second surface in a second dimension onto an output surface.

14. The device of claim 11 wherein the first reflective surface and the second reflective surface define an optical cavity, the optical cavity being at least partially occupied by at least one transparent material.

15. The device of claim 11, wherein the reflectivity of the second surface is spatially varying.

16. The device of claim 11, wherein the reflectivity of the second surface is substantially uniform.

17. The device of claim 10 comprising a processor having an output plane, wherein the input beam has a profile, wherein the profile includes a complex amplitude distribution, and wherein the processor enables the profile to be controlled to produce a spectral envelope weighting over the output plane of the processor.

18. The device of claim 10, comprising: an optical system for operating on the discrete multiple time-delayed output beams to simultaneously channelize the plurality of collimated input beams into constituent frequencies.

19. A method comprising:

providing at least one collimated input beam, the at least one input beam comprising at least one frequency, and processing the at least one collimated input beam to produce discrete multiple time-delayed output beams mutually phase-shifted as a function of the at least one frequency of the input beam, the discrete multiple time-delayed output beams interfering at a plane and being spatially distributed by a processor such that each of the discrete multiple time-delayed output beams occupies a different region and is individually weightable in complex amplitude, whereby the at least one input beam is channelized into constituent frequencies at the plane.

20. The method of claim 19, wherein the processing step comprises:

providing a first reflective surface, providing a second reflective surface, the second reflective surface having a reflectivity of less than 100%, and positioning the first reflective surface and the second reflective surface so that at least a portion of a beam directed toward the second surface is reflected multiple times between the first and second surfaces, thereby producing multiple time-delayed output beams exiting the second surface.

21. The method of 20, claim comprising:

operating on the multiple time-delayed output beams exiting the second surface to channelize the at least one input beam into constituent frequencies.

22. The method of claim 21, comprising:

Fourier transforming the multiple time-delayed output beams exiting the second surface in a first dimension and imaging the multiple time-delayed output beams exiting the second surface in a second dimension onto an output surface.

23. The method of claim 20 sing positioning the first reflective surface and the second reflective surface so that the first reflective surface and the second reflective surface define an optical cavity, and at least partially occupying the optical cavity with at least one transparent material.

24. The method of claim 20, wherein the reflectivity of the second surface is spatially varying.

25. The method of claim 20, wherein the reflectivity of the second surface is substantially uniform.

26. The method of claim 19, comprising: operating on the discrete multiple time-delayed output beams to channelize the at least one input beam into constituent frequencies.

27. The method of claim 19 comprising providing a processor having an output plane, wherein the input beam has a profile, wherein the profile includes a complex amplitude distribution, and comprising controlling the profile to produce a spectral envelope weighting over the output plane of the processor.

28. A method comprising:

providing a plurality of collimated input beams, each of the input beams comprising at least one frequency, and processing the plurality of collimated input beams to produce discrete multiple time-delayed output beams, the discrete multiple time-delayed output beams being mutually phase-shifted as a function of the at least one frequency of a corresponding input beam, the discrete multiple time-delayed output beams interfering at a plane and being spatially distributed by a processor such that each of the discrete multiple time-delayed output beams occupies a different region and is individually weightable in complex amplitude, whereby the plurality of collimated input beams are simultaneously channelized into constituent frequencies at the plane.

29. The method of claim 28, wherein the processing step comprises:

providing a first reflective surface, providing a second reflective surface, the second reflective surface having a reflectivity of less than 100%, and positioning the first reflective surface and the second reflective surface so that at least a portion of a beam directed toward the second surface is reflected multiple times between the first and second surfaces, thereby producing multiple time-delayed output beams exiting the second surface.

30. The method of claim 29, comprising:

operating on the multiple time-delayed output beams exiting the second surface to channelize at least one corresponding input beam into constituent frequencies.

31. The method of claim 30, comprising:

Fourier transforming the multiple time-delayed output beams exiting the second surface in a first dimension and imaging the multiple time-delayed output beams exiting the second surface in a second dimension onto an output surface.

32. The method of claim 29 comprising: positioning the first reflective surface and the second reflective surface so that the first reflective surface and the second reflective surface define an optical cavity, and at least partially occupying the optical cavity with at least one transparent material.

33. The method of claim 29, wherein the reflectivity of the second surface is spatially varying.

34. The method of claim 29, wherein the reflectivity of the second surface is substantially uniform.

35. The method of claim 28, comprising: operating on the discrete multiple time-delayed output beams to simultaneously channelize the plurality of collimated input beams into constituent frequencies.

36. The method of claim 28 comprising providing a processor having an output plane, wherein the input beam has a profile, wherein the profile includes a complex amplitude distribution, and comprising controlling the profile to produce a spectral envelope weighting over the output plane of the processor.

37. An optical processor for processing at least one collimated input beam to produce discrete multiple time-delayed output beams that interfere at a plane, the input beam comprising at least one frequency, the discrete multiple time-delayed output beams being mutually phase-shifted as a function of the at least one frequency of the input beam and being spatially distributed by a processor, the processor comprising an optical tapped delay line and an optical system configured to enable the multiple time-delayed output beams to interfere at the plane, such that each of the discrete multiple time-delayed output beam being channelized with a resolution not coarser than 10 GHz into constituent frequencies and having an optical throughput efficiency of not less than 40%.

38. An optical processor for processing at least one collimated input beam to produce discrete multiple time-delayed output beams that are mutually phase-shifted and spatially distributed, the processor comprising an optical tapped delay line and an optical system configured to enable the multiple time-delayed output beams to interfere at the plane, such that each of the discrete multiple time-delayed output beams occupies a different region and is individually weightable in complex amplitude, the input beam being channelized with a resolution not coarser than 10 GHz into constituent frequencies and having an optical throughput efficiency of not less than 40%.

39. An optical processor for processing at least one collimated input beam to produce discrete multiple time-delayed output beams that interfere at a plane, the output beams are mutually phase-shifted and spatially distributed, the processor comprising an optical tapped delay line and an optical system configured to enable the multiple time-delayed output beams to interfere at the plane, such that each of the discrete multiple time-delayed output beams occupies a different region and is individually weightable in complex amplitude, the input beam being channelized with a resolution not coarser than 10 GHz into constituent frequencies and having an optical throughput efficiency of not less than 40%.

40. A device comprising a processor for processing at least one collimated input beam to produce discrete multiple time-delayed output beams that interfere at a plane, the input beam comprising at least one frequency, the discrete multiple time-delayed output beams being mutually phase-shifted as a function of the at least one frequency of the input beam and being spatially distributed by the processor, each of the discrete multiple time-delayed output beams being weighted in complex amplitude to produce an optical spot having a controlled shape, the processor comprising an optical tapped delay line and an optical system configured to enable the multiple time-delayed output beams to interfere at the plane, whereby the at least one collimated input beam is channelized into constituent frequencies.

41. A device comprising a processor for processing a plurality of collimated input beams to produce discrete multiple time-delayed output beams that interfere at a plane, each of the input beams comprising at least one frequency, the discrete multiple time-delayed output beams being mutually phase-shifted as a function of the at least one frequency of a corresponding input beam and being spatially distributed by the processor, each of the discrete multiple time-delayed output beams being weighted in complex amplitude to produce an optical spot having a controlled shape, the processor comprising an optical tapped delay line and an optical system configured to enable the multiple time-delayed output beams to interfere at the plane, whereby the plurality of collimated input beams are simultaneously channelized into constituent frequencies.

42. A method comprising: providing at least one collimated input beam, the at leas one input beam comprising at least one frequency, and processing the at least one input beam to produce discrete multiple time-delayed output beams that interfere at a plane, the discrete multiple time-delayed output beams being mutually phase-shifted as a function of the at least one frequency of the input beam and being spatially distributed by a processor, each of the discrete multiple time-delayed output beams being weighted in complex amplitude to produce an optical spot having a controlled shape, whereby the at least one input beam is channelized into constituent frequencies.

43. A method comprising: providing a plurality of collimated input beams, each of e input beams comprising at least one frequency, and processing the plurality of input beams to produce discrete multiple time-delayed output beams that interfere at a plane, the discrete multiple time-delayed output beams being mutually phase-shifted as a function of the at least one frequency of a corresponding input beam and being spatially distributed by a processor, each of the discrete multiple time-delayed output beams being weighted in complex amplitude to produce an optical spot having a controlled shape, whereby the plurality of collimated input beams are simultaneously channelized into constituent frequencies.

44. An optical processor for processing at least one collimated input beam to produce discrete multiple time-delayed output beams that interfere at a plane, the input beam comprising at least one frequency, the discrete multiple time-delayed output beams being mutually phase-shifted as a function of the at least one frequency of the input beam and being spatially distributed by the processor, the processor comprising an optical tapped delay line and an optical system configured to enable the multiple time-delayed output beams to interfere at the plane, each of the discrete multiple time-delayed output beams being weighted in complex amplitude to produce an optical spot having a controlled shape, the input beam being channelized with a resolution not coarser than 10 GHz into constituent frequencies and having an optical throughput efficiency of not less than 40%.

45. An optical processor for processing at least one collimated input beam to produce discrete multiple time-delayed output beams that interfere at a plane, that are mutually phase-shifted and spatially distributed by the processor, the processor comprising an optical tapped delay line and an optical system configured to enable the multiple time-delayed output beams to interfere at the plane, each of the discrete multiple time-delayed output beams being weighted in complex amplitude to produce an optical spot having a controlled shape, the input beam being channelized with a resolution not coarser than 10 GHz into constituent frequencies and having an optical throughput efficiency of not less than 40%.

46. An optical processor for processing at least one collimated input beam to produce discrete multiple time-delayed output beams that interfere at a plane, each of the discrete multiple time-delayed output beams being weighted in complex amplitude to produce an optical spot having a controlled shape, the processor comprising an optical tapped delay line and an optical system configured to enable the multiple time-delayed output beams to interfere at the plane, whereby the plurality of collimated multiple input beams are simultaneously channelized into constituent frequencies at the plane.

* * * * *